United States Patent [19]

Sumal

[11] 4,450,715
[45] May 29, 1984

[54] METHOD FOR MEASURING THE FLOW OF A MEDIUM

[75] Inventor: Jaihind S. Sumal, Schwieberdingen, Fed. Rep. of Germany

[73] Assignee: Robert Bosch GmbH, Stuttgart, Fed. Rep. of Germany

[21] Appl. No.: 415,611

[22] Filed: Sep. 3, 1982

[30] Foreign Application Priority Data

Feb. 5, 1982 [DE] Fed. Rep. of Germany ....... 3203986

[51] Int. Cl.³ .......................... G01F 1/00; G01M 15/00
[52] U.S. Cl. ...................................... 73/118.1; 73/198; 364/510; 364/571
[58] Field of Search .................... 73/115, 118 A, 118, 73/198; 364/510, 571

[56] References Cited

U.S. PATENT DOCUMENTS 4,322,970  4/1982  Peter .................................. 73/118 A
4,404,846  9/1983  Yamauchi et al. ................ 73/118 A Primary Examiner—Donald O. Woodiel
Attorney, Agent, or Firm—Edwin E. Greigg

[57] ABSTRACT

A method is proposed for the measurement of a medium, in particular of the air aspirated by an internal combustion engine, in a flow cross section and for correcting the flow rate value (q) furnished by a flow rate meter in the event of a pulsating flow. To this end, by measuring the pressure of the medium ($p_m$) at a restriction and by comparing it with a pressure value ($p_s$) for steady flow associated with the measured flow rate value (q), the pulsation amplitude (a) is determined and is multiplied via characteristic value memories for the flow rate values (q), in order to correct an average-value error and/or to correct the error in the event of reversed flow, with a correction value (k) in order to form a corrected flow rate value (Q).

3 Claims, 1 Drawing Figure

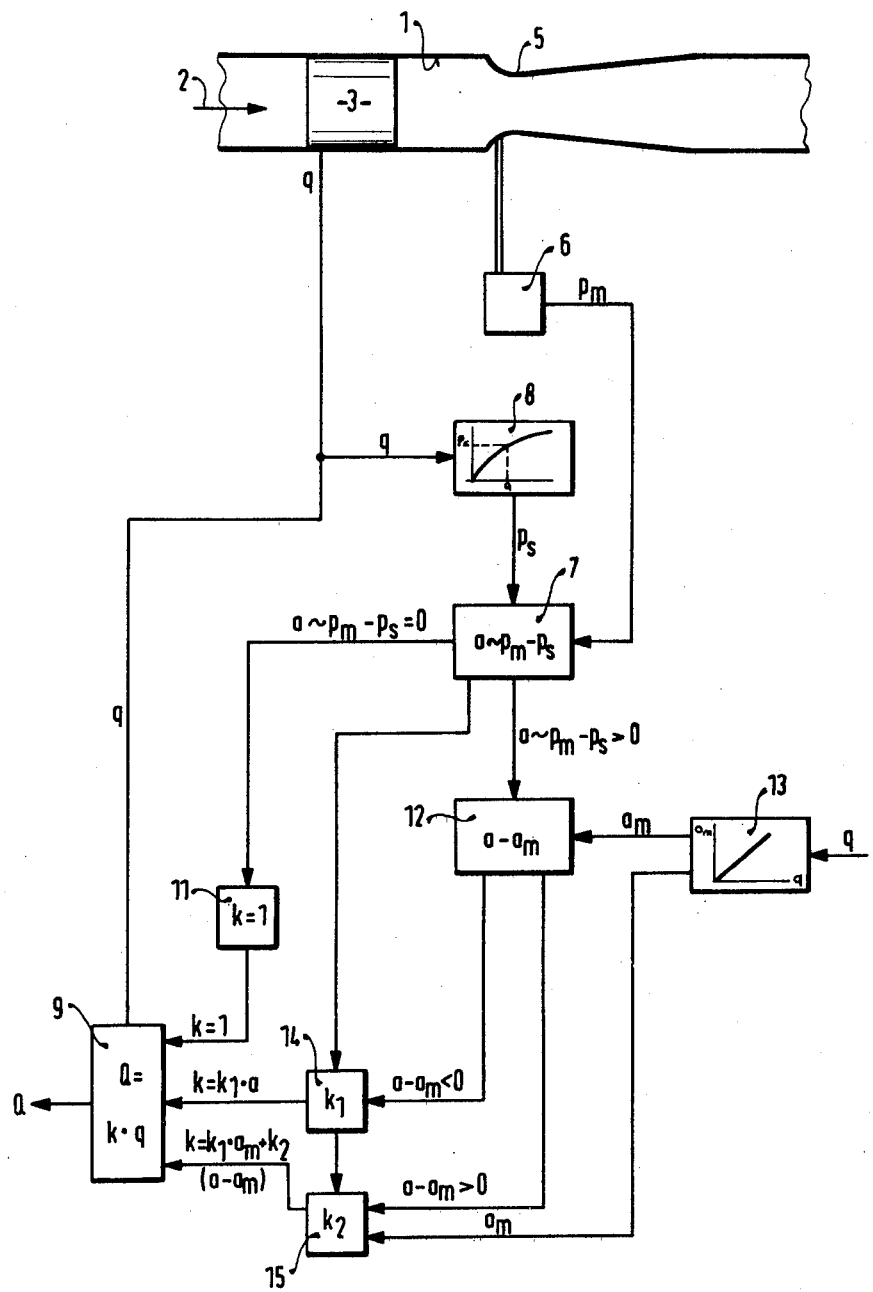

METHOD FOR MEASURING THE FLOW OF A MEDIUM

BACKGROUND OF THE INVENTION

The invention is based on a method for measuring the flow of a medium, in particular of the air aspirated by an internal combustion engine, as generally defined by the appended claims. Flow rate meters are already known but in which, when they are used to measure the air aspirated by internal combustion engines, an incorrect measurement signal is produced because of pulsations in the aspirated air, which are particularly strong in certain operating ranges. In such flow measuring devices, either the flow measurement is therefore interrupted in the event of very high pulsation amplitudes, or else the measurement value is corrected via a correction curve ascertained in a test. However, if the flow rate meter is used for measuring the air aspirated by internal combustion engines, then a separate curve must be ascertained for each engine type, and even among identical engines measurment errors will still occur because the aspiration behavior of even identical engines varies. Thus particularly in mechanical flow rate meters (on the baffle plate principle), the measurement signal generated by the flow rate meter is a function not only of the flow rate of the medium but also of the pulsation amplitude; as these pulsation amplitudes become larger, errors in measurement increase as well. Flow rate meters having temperature-sensitive elements such as a hot wire or hot film function so rapidly that they are capable of following up the pulsating flow, so that in such flow rate meters a measurement error is produced because of the measurement of the reverse flow, since the flow rate meter detects even the reversed flow as a positive value, on the one hand, while on the other hand a so-called average-value error occurs as a function of the course of the characteristic curve of the flow rate meter.

OBJECT AND SUMMARY OF THE INVENTION

The method according to the invention for measuring the flow of a medium, in particular of air aspirated by an internal combustion engine, has the advantage over the prior art that an exact flow rate value can be ascertained by correcting the flow rate value in accordance with the pulsation.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows, in simplified form, an exemplary embodiment of the invention which is described in detail below.

DESCRIPTION OF THE PREFRRED EMBODIMENT

The drawing shows a flow cross section 1, for instance an air intake tube of an internal combustion engine (not shown), through which a medium, for instance the air aspirated by the engine, flows in the direction of the arrow 2. A flow rate meter 3 of known design is disposed in the flow cross section 1, being by way of example a baffle plate flow rate meter or a hot wire flow rate meter. The flow rate meter 3, in a known manner, furnishes a flow rate value q. A restriction 5 may be provided in the flow cross section 1 either upstream or downstream of the flow rate meter 3, being by way of example a Venturi, a screen or some other flow resistance. Additionally, this restriction 5 may equally well be embodied, in a manner not shown, in a bypass around the flow rate meter 3. The pressure drop at a restriction, in the case of a pulsating flow, is known to be a function of the flow of the medium and a function of the pulsation amplitude, so that with a larger pulsation amplitude a greater pressure drop also occurs.

In accordance with the invention, the pressure of the medium $p_m$ is now ascertained at the restriction 5 by means of a pressure-sensing element 6, for instance a pressure measurement device of known design. The pressure of the medium $p_m$ is furnished to a difference-forming circuit 7, in which the difference $(p_m - p_s)$ is formed. The pressure value $p_s$ for steady flow, associated with the flow rate value q, is furnished to the difference-forming circuit 7 from a characteristic curve memory 8, in which the association of the flow rate value q to a pressure value $p_s$ in the flow cross section at steady flow is stored. The difference $(p_m - p_s)$ formed in the difference-forming circuit 7 from the measured pressure of the medium $p_m$ and the pressure value $p_s$ associated with the flow rate value q is proporational to the pulsation amplitude a. If the difference $(p_m - p_s)$ is equal to zero, then no pulsation is occuring. In that case, a correction circuit 9, in which a corrected flow rate value Q is formed by means of multiplying the flow rate value q with a correction factor k, is triggered via a correction value memory 11 with a correction value of $k = 1$, so that the value produced for the flow rate value Q is the same as that of the flow rate value q.

If the pulsation amplitude a, which is proportional to the difference $(p_m - p_s)$, is greater than zero, then the value of the pulsation amplitude a is delivered to a further difference-forming circuit 12, which is also supplied with a pulsation amplitude value for reversed flow $a_m$, which is in a fixed association with the flow rate value q and can be taken from a characteristic curve memory 13 in accordance with the flow rate value q. If the amplitude difference $(a - a_m)$ formed in the difference-forming circuit 12 from the pulsation amplitude a and the pulsation amplitude value $a_m$ for reversed flow is less than zero, then no reversed flow is taking place, and a correction value k is fed to the correction circuit 9 which is formed from the product of a correction value $k_1$, which is dependent on the course of the characteristic curve of the flow rate meter, and of the pulsation amplitude a; as a result, if the characteristic curve of the flow rate meter 3 is not linear, a correction is effected of the so-called average-value error of the flow rate value q which occurs in the case of pulsation.

If the amplitude difference $(a - a_m)$ formed in the difference-forming circuit 12 is larger than zero, then the correction circuit 9 is triggered via a correction value memory 15, which receives, in addition to the amplitude difference $(a - a_m)$, the correction value $k_1$ and the pulsation amplitude value $a_m$ for reversed flow, and in which a fixed correction value $k_2$ for the reversed flow is stored in memory. In the correction value memory 15, the sum of the product $(k_1 \cdot a_m)$ of the correction value $k_1$ with the pulsation amplitude value $a_m$ for reversed flow and the product $k_2 (a - a_m)$ of the correction value $k_2$ for reversed flow and the amplitude difference $(a - a_m)$ formed, so that in correction circuit 9 a product is formed of the flow rate value q and a correction value $$k = k_1 \cdot a_m + k_2(a - a_m)$$

and a flow rate value Q can be picked up at the output of the correction circuit 9 which has been corrected in terms of the average-value error and of the reversed flow.

The foregoing relates to a preferred exemplary embodiment of the invention, it being understood that other embodiments and variants thereof are possible within the spirit and scope of the invention, the latter being defined by the appended claims.

What is claimed and desired to be secured by letters patent of the United States is:

1. A method for measuring the flow of a medium, in particular of air aspirated by an internal combustion engine, in a flow cross section by means of a flow rate meter and for correcting the flow rate value furnished by the flow rate meter in the event of pulsating flow, comprising the steps of, measuring at a restriction of the flow cross section the pressure of the medium ($p_m$); forming the difference ($p_m - p_s$) between the pressure of the medium ($p_m$) and a pressure value ($p_s$) associated with the flow rate value (q) for steady flow in order to ascertain the pulsation amplitude ($a \sim p_m - p_s$); forming the amplitude difference ($a - a_m$) between the pulsation amplitude (a) and a pulsation amplitude value for reversed flow ($a_m$) associated with the flow rate value (q); and forming a corrected flow rate value (Q) by multiplying the flow rate value (q) with a correction value (k) proportional to the value of the amplitude difference ($a - a_m$).

2. A method according to claim 1, wherein, when the value of the amplitude difference ($a - a_m$) is less than zero, the correction value (k) is formed from the product ($k_1 \cdot a$) of a correction value ($k_1$) dependent on the course of a characteristic curve of the flow rate meter and the pulsation amplitude (a) in order to correct a possible average-value error.

3. A method according to claim 1 wherein, when the value of the amplitude difference ($a - a_m$) is greater than zero, the correction value (k) is formed from the sum of a product ($k_1 \cdot a_m$) of the correction value ($k_1$) and the pulsation amplitude value for reversed flow ($a_m$) and of a product ($k_2 \cdot (a - a_m)$) of a correction value ($k_2$) for reversed flow and the amplitude difference ($a - a_m$).

* * * * *